United States Patent
Kadowaki

[15] 3,684,210
[45] Aug. 15, 1972

[54] AUTOMATIC FILM FEED DEVICE FOR SMALL MOVIE PROJECTORS USING A FILM CARTRIDGE

[72] Inventor: Tatsusuke Kadowaki, Yokohama, Japan

[73] Assignee: Kabushiki Kaisha Ricoh, Tokyo, Japan

[22] Filed: Sept. 10, 1970

[21] Appl. No.: 70,694

[30] Foreign Application Priority Data

Sept. 22, 1969 Japan .................... 44/75679

[52] U.S. Cl. ................. 242/192, 242/186, 242/205
[51] Int. Cl. ..... G03b 1/02, B65h 17/14, G11b 15/32
[58] Field of Search......242/192, 195, 197, 205, 198, 242/210, 186; 226/91, 92; 352/157, 158

[56] References Cited

UNITED STATES PATENTS

| 3,468,498 | 9/1969 | Bunting ................ 242/207 |
| 3,558,028 | 1/1971 | Bunting ............... 242/192 X |

Primary Examiner—George F. Mautz
Attorney—McGlew and Toren

[57] ABSTRACT

An automatic film feed device comprises a film threader for automatically feeding, from a film cartridge, a film to be projected, a film stripper pawl for stripping the leading end of the film from the outer convolution of the film roll, and a detector at a film gate to detect when the film has entered the film gate. This detector, upon detection of a film entering the film gate, stops feeding of the film by the film threader, resulting in movement of the film threader and the film stripper pawl to retracted positions. The film threader and stripper pawl perform their functions only when no film is present in the film gate, and responsive to actuation of a projector starting switch.

9 Claims, 4 Drawing Figures

INVENTOR.
TATSUSUKE KADOWAKI
BY McGlew and Toren
ATTORNEYS

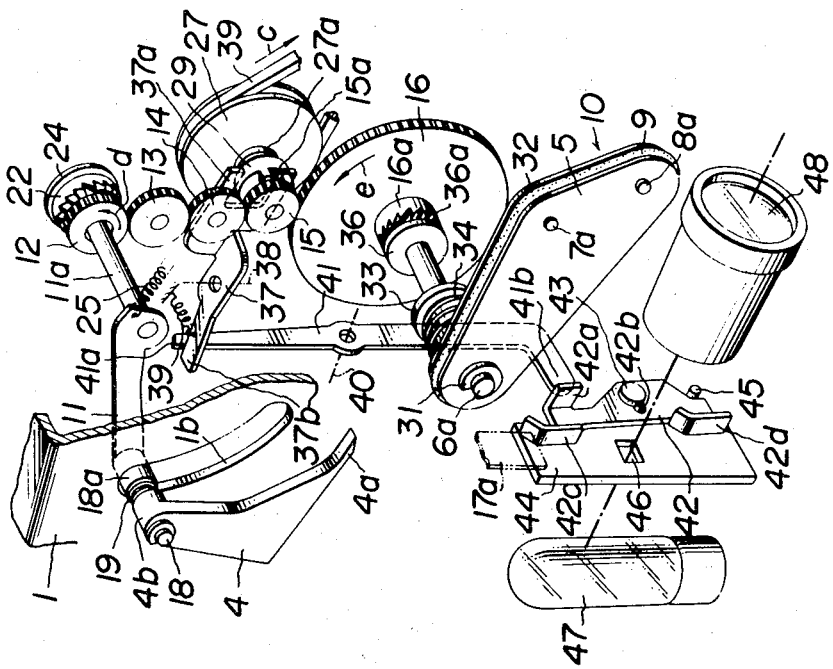
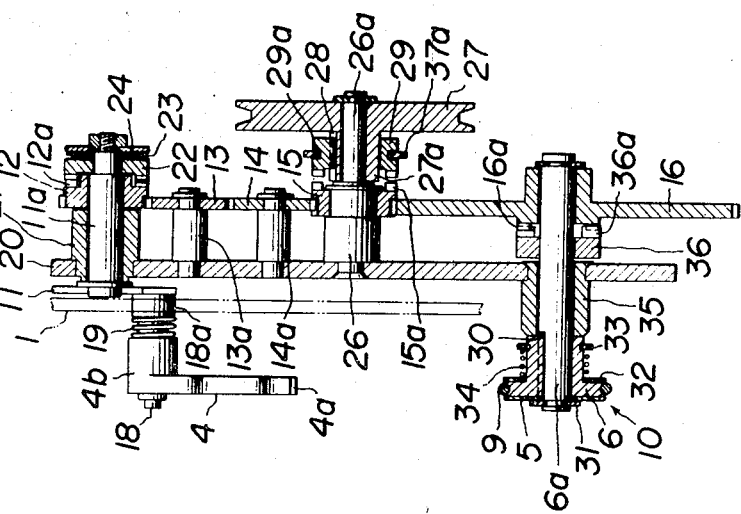

3,684,210

AUTOMATIC FILM FEED DEVICE FOR SMALL MOVIE PROJECTORS USING A FILM CARTRIDGE

BACKGROUND OF THE INVENTION

Recently, there has been a tendency, in small movie projectors, to encase a movie film in a cartridge which is mounted on the projector, as this facilitates automatic loading of the projector with a roll of film as well as safe storage of the roll of film when not in use.

In a known device for feeding film automatically from a film cartridge mounted on a known projector, a relatively narrow endless belt is introduced into the cartridge through the film delivery opening thereof, and a part of the belt is caused to press against the outer peripheral surface of the film roll so that the leading end portion of the film may be directed out of the cartridge. In this arrangement, it is essential that the endless belt for guiding the film be caused to press against the outer peripheral surface of the film roll only when the film is to be delivered from the cartridge, and that the endless belt be released from engagement with the film roll when the leading end portion of the film guided thereby has come under the influence of a film advancing means in the projector.

SUMMARY OF THE INVENTION

This invention relates to small movie projectors for using film in a cartridge and, more particularly, to a novel film threading arrangement for withdrawing film from the cartridge.

In accordance with the invention, the film threader includes a relatively narrow endless belt, of the type mentioned above, which engages the peripheral surface of the film roll in the cartridge to feed the film from the cartridge. A film stripper pawl is engageable with the outer convolution of the roll of film to strip the leading end of the film from the outer convolution of the film roll. When the leading end of the thus stripped and fed film enters a film gate positioned between the light source and a lens system, it displaces a movable element which, in turn, effects disengagement of driving means for the film threader and the film stripper pawl.

A feature of the invention is the provision of slipping means in the driving mechanism for the film feeding belt and the film stripper pawl, to prevent damage to the parts. A further feature is a provision of one-way rotation clutch means in the drive mechanism, whereby parts may be driven in the reverse direction without affecting the film threader or the film stripper pawl.

An object of the invention is to provide an improved film threader and stripper arrangement for a small movie camera usable with film cartridges.

Another object of the invention is to provide such a movie projector in which operation of the film threader and a film stripper pawl is terminated automatically responsive to the leading end of the film entering a film gate.

A further object of the invention is to provide such a movie projector in which the leading end of the film, when entering the film gate, displaces a movable element which, in turn, effects disengagement of clutch means included in a driving arrangement for the film threader and the film stripper pawl.

For an understanding of the principles of the invention, reference is made to the following description of a typical embodiment thereof as illustrated in the accompanying drawings.

BRIEF DESCRIPTION OF THE DRAWINGS

In the drawings:

FIG. 3 is a perspective view illustrating the drive mechanism of the film feed device shown in FIGS. 1 and 2; and FIG. 4 is a vertical sectional view taken along the line IV—IV of FIG. 1 and looking in the direction of the arrows.

DESCRIPTION OF THE PREFERRED EMBODIMENT

Figure 1:
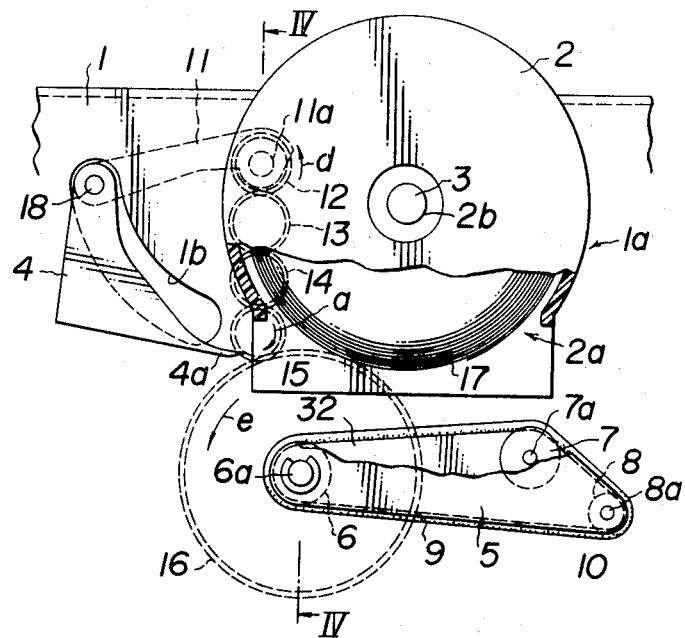
FIG. 1. is a partial side elevation view of a small movie projector incorporating an automatic film feed device embodying the invention, the device being shown in the inoperative or retracted position.
Figure 2:
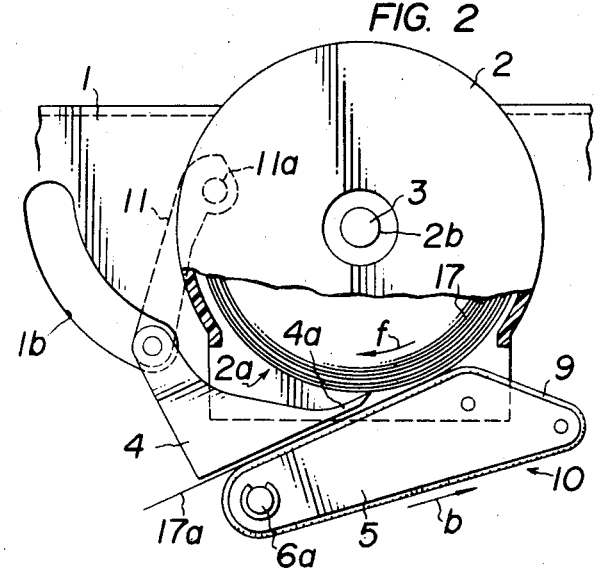
FIG. 2 is a view similar to FIG. 1 but illustrating the device in its operative position.

Referring first to FIGS. 1 and 2, a small movie projector 1 has a side wall formed with a cartridge mounting portion 1a. A film cartridge 2, such as in Eastman Kodak Company super 8 mm cartridge, for example, is mounted on the cartridge attaching portion 1a through suitable holding means (not shown). A film delivery opening 2a of cartridge 2 faces downwardly, and a real opening 2b of cartridge 2 fits over a film supply spindle 3.

Projector 1 has a film stripper pawl 4 disposed on one side of the film delivery opening 2a of cartridge 2, and also has a film threader 10. Film threader 10 comprises pulleys 6, 7 and 8 mounted on a support plate 5, and an endless belt 9 trained about these pulleys and disposed in a position below film delivery opening 2a of cartridge 2. The manner of operation of stripper pawl 4 and film threader 10 will be described below.

Stripper pawl 4 is connected, through a slot 1b formed in the side wall of projector 1, to a support arm 11 mounted on a shaft 11a, and shaft 11a is connected to a gear 15 through gears 12, 13 and 14. Slot 1b is a circular arc centered on the axis of shaft 11a. Pulley 6 is secured to one end of a shaft 6a for operating the film threader which is maintained in frictional engagement with support plate 5. A gear 16 on the other end of shaft 6a meshes with a gear 15 which is adapted to be rotated in the direction of the arrow a in FIG. 1 by a driving wheel, described more fully hereinafter, which is rotated responsive to actuation of a starter button of projector 1.

As gear 15 is rotated, stripper pawl 4 pivots counterclockwise about the axis of shaft 11a of support arm 11, so that forward end 4a of stripper pawl 4 will extend through cartridge opening 2a to be brought into light pressing engagement with the outer peripheral surface of a roll of film 17 in cartridge 2. Rotation of gear 15 also causes support plate 5 for threader 10 to pivot counterclockwise about the axis of shaft 6a, so that belt 9 will be brought into pressing engagement with the outer peripheral surface of film roll 17. FIG. 2 illustrates stripper pawl 4 and film threader 10 in the operative positions.

Belt 9, which is adapted to move in the direction of arrow b of FIG. 2, while being maintained in pressing contact with the outer peripheral surface of film roll 17, moves a leading end portion 17a of the film roll, and which has been stripped from the film roll by forward end 4a of stripper pawl 4, toward a film gate described more fully hereinafter. As a leading end portion 17a of the film enters the film gate, a detection means, described hereinafter, is actuated to disconnect gear 15 from the wheel driving this gear so that gear 15 stops rotating. As a result, stripper pawl 4 and threader 10 are restored to their original retracted positions, as shown in FIG. 1, with the film being intermittently fed by a film advance pawl (not shown). The details of the automatic film feed device of the invention will now be described.

Referring to FIG. 3, stripper pawl 4 has hub 4b which is pivotally supported by a smaller diameter forward end portion of a shaft 18 which has a larger diameter portion 18a extending loosely through slot 1b and fixedly secured to a free end of support arm 11. A spiral spring 19 embraces shaft 18 between larger diameter portion 18a and hub 4b of stripper pawl 4, so that pawl 4 normally is biased by spring 19 in a clockwise direction about shaft 18, as viewed in FIG. 1. Also, pawl 4 normally is locked in position by a suitable stopper (not shown) on support arm 11 so that the pawl may be maintained with a proper angular orientation.

Support arm 11 is fixedly secured to an outer end of shaft 11a which is rotatably supported in a support plate 20 through the medium of a bearing 21, as best seen in FIG. 4. A gear 12 is rotatably mounted adjacent the inner end of shaft 11a, and carries a pawl 12a, in the form of a relatively narrow resilient strip, secured to an end face of gear 12, and pawl 12a is maintained in engagement with a ratchet 22 rotatably mounted on shaft 11a. A washer 24 is secured to shaft 11a through the medium of a plate spring 23, which biases ratchet 22 to press against pawl 12a while maintaining ratchet 22 and washer 24 in frictional connection with each other.

Support arm 11 normally is biased by a spring 25 to pivot clockwise about the axis of shaft 11a, as viewed in FIG. 1. Thus, when shaft 11a of arm 11 is not rotated, base portion 18a of shaft 18, fixedly secured to the free end of arm 11, bears against the upper end edge of slot 1b.

Gear 13, meshing with gear 12, gear 14, meshing with gear 13, and gear 15, meshing with gear 14, are rotatably supported by respective shafts 13a, 14a and 26 each fixedly secured to support plate 20, as best seen in FIG. 4. Shaft 26 has a smaller diameter portion 26a supporting a driving pulley 27 having a cylindrical hub 27a engaged with a clutch ring 29 through a keyway 28, so that clutch 29 will rotate with pulley 27 as a unit while being slidable axially of shaft 26 relative to pulley 27. Gear 15 is formed on one surface with a clutch portion 15a so that, if clutch ring 29 is moved to the left, as viewed in FIG. 4, to engage clutch portion 15a of gear 15, driving pulley 27 is connected to gear 15. Conversely, if clutch ring 29 is moved to the right to disengage clutch portion 15a of gear 15, rotation of pulley 27 is not transmitted to gear 15.

Pulley 6 of threader 10 is connected to rotate with threader operating shaft 6a through a keyway 30 (FIG 4), so that pulley 6 and shaft 6a rotate as a unit. Support plate 5 is loosely mounted on shaft 6a outwardly of pulley 6, and retained on the shaft by an E-ring 31 secured to shaft 6a outwardly of support plate 5. A support plate 32 is loosely mounted on a cylindrical hub of pulley 6 and a spring 34 embraces the hub of pulley 6 and is disposed between support plate 32 and a flange 33. Spring 34 biases support plate 32 to press against pulley 6 so that plate 32 and pulley 6 are maintained in frictional engagement with each other.

Shaft 6a is rotatably journalled by a bearing 35 fixedly secured to support plate 20 and has a collar 36 inwardly of plate 20. Gear 16, meshing with gear 15, is loosely mounted on the inner end of shaft 6a, and has one surface thereof formed with a ratchet portion 16a adapted to cooperate with a pawl 36a, in the form of a resilient strip, and mounted at one end surface of collar 36.

Support plates 5 and 32 of threader 10 rotatably support shafts 7a and 8a of pulleys 7 and 8, respectively, as best seen in FIG. 1. Endless belt 9 is trained about pulleys 6, 7 and 8, as mentioned above, and the upper edges of support plates 5 and 32 are disposed below the outer surface of belt 9 as shown in FIG. 1, so that belt 9 projects above these upper edges an amount sufficient that it can press against the outer peripheral surface of film roll 17. Threader 10 is spaced downwardly from the roll of film 17, as shown in FIG. 1, when threader operating shaft 6a is not rotated. When threader 10 is in this position, it is limited from further downward movement by a suitable stopper (not shown).

Clutch ring 29 has a peripheral groove 29a, as best seen in FIG. 4, engaged with a forked portion 37a of a bent arm of a bifurcated lever 37, best seen in FIG. 3. Lever 37 is pivotally supported by a shaft 38 and normally biased by a spring 39 to pivot about the axis of shaft 38 in a clockwise direction as viewed from above in FIG. 3. Thus, lever 37 normally urges clutch ring 29, through forked portion 37a, to move to the left, as viewed in FIG. 4, into engagement with clutch portion 15a of gear 15.

A belt 39 is trained about driving pulley 27, as seen in FIG. 3, and connects pulley 27 to the main shutter shaft (not shown) of the projector. When the film is advanced in normal projection operation, belt 39 moves in the direction of arrow c, as shown in FIG. 3, so that gear 15 is rotated, through pulley 27 and clutch ring 29, in the direction of the arrow a of FIG. 1. The clutch means described above may take any other form, such as a clutch means relying on frictional engagement, for example. If gear 15 rotates in the direction of arrow a, then gear 12 rotates in the direction of arrow d and gear 16 rotates in the direction of arrow e.

Pawl 12a of gear 12 and ratchet 22 transmit to pawl operating shaft 11a only rotation of gear 15 in the direction of arrow a, so that when gear 15 rotates in the opposite direction, pawl 12a and ratchet 22 merely rotate idly and do not transmit rotation of gear 15 to shaft 11a. On the other hand, ratchet portion 16a of gear 16 and collar 36 transmit, to threader operating shaft 6a, only rotation of gear 16 in the direction of arrow e, so that, when gear 16 rotates in the opposite direction, ratchet portion 16a and collar 36 rotate idly and do not transmit the rotation of gear 16 to shaft 6a. The two ratchet mechanisms described above may be replaced by one-way rotation clutch means of any other form.

If gear 12 rotates in the direction of arrow *d* as shown in FIG. 1, its rotation is transmitted to stripper pawl operating shaft 11*a* as mentioned, so that supporting arm 11 is moved counterclockwise against the bias of spring 25. Thus, the larger diameter portion 18*a* of shaft 18 also moves along slot 1*b* in the same direction as arm 11, so that stripper pawl 4 follows the movement of arm 11. The counterclockwise movement of support arm 11 ends as portion 18*a* of shaft 18 engages the lower end edge of slot 1*b*. When movement of support arm 11 is thus arrested, washer 24 and ratchet 22, mounted on shaft 11*a*, slide relative to each other and to plate spring 23, so that the excess operating force exerted on support arm 11 is absorbed by this frictional connection. Thus support arm 11 is held positively in the position shown in FIG. 2. When portion 18*a* of shaft 18 thus is maintained in engagement with the lower end edge of slot 1*b*, forward end 4*a* of stripper pawl 4 is brought into pressing engagement with the outer peripheral surface of the roll film 17, as previously mentioned and as shown in FIG. 2.

Furthermore, as gear 16 rotates in the direction of arrow *e* (FIG. 1), its rotation is transmitted to shaft 6*a* through ratchet portion 16*a* engaging pawl 36*a* and collar 36, so that pulley 6 is rotated. At the same time, support plates 5 and 32, maintained frictionally engaged with pulley 6, begin to pivot counterclockwise about the axis of shaft 6*a*, as viewed in FIG. 1. Thus endless belt 9 is brought into pressing engagement with the outer peripheral surface of film 17, while moving in the direction of the arrow *b* of FIG. 2. A sip occurs between support plates 5 and 32 and pulley 6, when belt 9 is brought into such pressing engagement with film 17, so that the excess operating force exerted by pulley 6 on support plates 5 and 32 is absorbed by the slip and plates 5 and 32 are maintained in the position shown in FIG. 2.

The ratios of rotation of gears 14, 13 and 12, to the rotation of gear 15, is predetermined at a value higher than the ratio of rotation of gear 16 to the rotation of gear 15, so that stripper pawl 4 is brought into engagement with the outer peripheral surface of the roll of film 17 before threader 10 engages the roller film 17. In FIG. 2, as forward end 4*a* of pawl 4 presses against the outer peripheral surface of the roll of film 17, endless belt 9 also comes into engagement with the outer peripheral surface of film 17 while moving in the direction of arrow *b*, so that the roll of film 17 is rotated in the direction of the arrow *f* of FIG. 2. As the roll of film 17 rotates, the leading end portion 17*a* of film 17 is stripped from the outer convolution of the roll of film by end 4*a* of pawl 4 and guided by belt 9 to move to the left and downwardly as viewed in FIG. 2. At this time, leading end portion 17*a* of the film moves between the lower edge of stripper pawl 4 and the upper surface of belt 9, and the relative positions of pawl 4 and belt 9 are predetermined such that a clearance of suitable dimension is maintained between these parts by varying the angle of inclination of pawl 4 and threader 10 in dependence on the diameter of the roll of film 17.

As best seen in FIG. 3, a lever 41 pivotally mounted on a shaft 40 has an upper end portion 41*a* which engages one side of an arm 37*b* of bifurcated lever 37, and has a lower end portion 41*b* which engages a bent portion 42*a* of a film detector means 42. Film detector means 42 is formed with a horizontally oriented slot 42*b* receiving a screw 43 connected to a film gate 44, so that detector means 42 is loosely mounted on one side of film gate plate 44. A stop 45 engages one side of the lower portion of detector means 42, and bent portion 42*a* of detecter means 42 is biased, by bifurcated lever 37 acting through lever 41, to bear against gate plate 44. Thus, film detector means 42 normally is urged to pivot counterclockwise, as viewed in FIG. 3, and abut against stop 45. Movement of means 42 counterclockwise is limited by slot 42*b*.

Detector means 42 is formed with film guide portions 42*c* and 42*d* at its upper and lower ends, respectively, and at the side edge of film detector means 42 adjacent gate plate 44. A film guide plate (not shown) extends vertically along that side edge of gate plate 44 opposite to the side edge thereof on which detector means 42 is mounted. When film detector means 42 is in the position shown in FIG. 3, or in an inclined position, the distance between guide portion 42*d* and this film guide plate is substantially the same as the width of film 17. Accordingly, if leading end portion 17*a* of the film is introduced into film gate 44, it will move guide 42*c* of detector means 42 in a direction opposite to the direction in which the detector means normally is biased to move. As guide portion 42*c* is moved, detector means 42 moves clockwise about stop 45 so that bent portion 42*a* moves lever 41 which, in turn, moves lever 37 counterclockwise about shaft 38, as viewed from above in FIG. 3. Thus, lever 37 moves clutch ring 29 out of engagement with gear 15, so that driving pulley 27 is disengaged from gear 15, as shown in FIG. 4. This condition continues as long as film is present in film gate plate 44.

As gear 15 is disconnected from pulley 27, it stops rotating and support arm 11 returns from the position shown in FIG. 2 to the position shown in FIG. 1 by moving clockwise about the axis of shaft 11*a* under the bias of spring 25. Stripper pawl 4 also moves from the position shown in FIG. 2 to the position shown in FIG. 1 together with arm 11. Similarly, threader 10 returns from the position shown in FIG. 2 to the position shown in FIG. 1 under its own weight. At this time, gears 16, 15, 14 and 13 remain meshed with one another, pawl 12*a* remains engaged with ratchet 22, and ratchet portion 16*a* remains engaged with pawl 36*a* of collar 36. However, the direction of rotation of each of these elements is the same as the direction of rotation of shafts 11*a* and 6*a*, so that there is no difficulty.

In case either one of pawl 4 or threader 10 is restored to its original position earlier than the other, the shaft for operating the member which has not been restored to the original position will drive the gear of the member already restored to the original position. However, the direction of rotation of this gear at this time is opposite to the normal direction or rotation of the other operating shaft now remaining stationary, and the two shafts 11*a* and 6*a* are connected to their respective gears through respective one-way rotating clutch means, which are ratchet mechanisms in the embodiment described above. Thus, rotation is comfined to this part and not transmitted to the other operating shaft.

Assuming, for example, the stripper pawl 4 has returned to its original position as shown in FIG. 1 but threader 10 is still moving downwardly toward its original position, the movement of threader 10 will be transmitted through pulley 6, shaft 6a, collar 36, gears 16, 15, 14 and 13 to the gear 12. However, pawl 12a of gear 12 will rotate idly on ratchet 2 without transmitting rotation to shaft 11a. As leading end portion 17a of the film is introduced into film gate plate 44, as shown in FIG. 3, detector means 42 is moved in the manner mentioned, thereby disengaging clutch portion 15a of gear 15 from engagement with clutch ring 29. Thus, stripper pawl 4 and threader 10 are released from pressing engagement with the outer peripheral surface of the roll of film 17 and are returned to the respective operating positions shown in FIG. 1. Thereafter, the film is advanced through an aperture 46 and illuminated by a light source 47, as shown in FIG. 3, to project a picture through projecting lens 48 onto a screen (not shown). A film advance pawl (not shown) is provided at the same location as aperture 46 so as to advance the film intermittently. As mentioned, the clutch means remains disengaged when film is present in the film gate portion, so that rewinding of the film after completion of the projection, can be effected smoothly.

When an open reel of film is used in a projector incorporating the device of the invention, the leading end portion of the film has only to be gripped and introduced manually between endless belt 9 and stripper pawl 4 when pawl 4 is disposed in the film feed position where its forward end 4a is engaged by the stop and the endless belt 9 of threader 10 is brought into engagement with the lower edge of pawl 4. Thereafter, the film is threaded automatically into the projecting position.

When all the film of the open reel has been paid out from the supply reel, the film can be rewound directly from the take-up reel to the supply reel. In this case, the clutch means remains engaged because no film is present in the film gate portion. However, since the direction of rotation of pulley 39 is reversed, the rotation of gears 12 and 16 is not transmitted to ratchet 22 and collar 36, respectively.

It will be appreciated that the automatic film feed device of the invention has a very efficient mechanical construction and provides for a smooth advance of the film.

While a specific embodiment of the invention has been shown and described to illustrate the application of the principles of the invention, it will be understood that the invention may be embodied otherwise without departing from such principles.

What is claimed is:

1. In a movie projector using a film cartridge, containing a roll of film and having a film delivery opening, and including a reel mounting spindle and a film gate, an automatic film film feed device comprising, in combination, film threader means frictionally engageable with a roll of film, at said delivery opening, to rotate the roll of film; film stripper means engageable with the outer convolution of the roll of film, at said delivery opening, to strip the leading end of the film for guiding of the film between said threader and stripper means to said film gate; a driving member rotated responsive to activation of the projector; driving mechanism connected to said threader means and said stripper means and including a driven member; a clutch interposed between said driving member and said driven member; clutch actuating means biasing said clutch into the engaged position and operable to disengage said clutch; film detecting means at said film gate; said clutch actuating means normally biasing said film detecting means into the path of film entering said film gate; said driving mechanism, when the projector is activated and said clutch is engaged, positioning said film threader means and said film stripper means in engagement with the roll of film at said delivery opening to direct the leading end of the film toward said film gate; said film detecting means, responsive to film entering said film gate, operating said clutch actuating means to disengage said clutch to effect retraction of said film threader means and said film stripper means from the roll of film; each of said film threader means and said film stripper means including a respective operating shaft; respective gears included in said driving mechanism each operatively associated with a respective operating shaft; and respective one-way rotation clutches interposed between each gear and its respective operating shaft; said one-way clutches effecting rotation of the associated operating shaft by the respective gear only when said driving member is rotated in a direction corresponding to advance of the film through said film gate.

2. An automatic film feed device, as claimed in claim 1, in which each of said one-way rotation clutches comprises a ratchet and pawl mechanism.

3. An automatic film feed device, as claimed in claim 1, in which said film threader means comprises an endless belt trained about pulleys rotatably mounted in a pair of support plates, one of said pulleys being fixed to the respective operating shaft and constituting a drive pulley which is frictionally engaged with said support plates; said film threader means being pivotal into an out of engagement with the roll of film about the axis of the respective operating shaft.

4. An automatic film feed device, as claimed in claim 3, in which said endless belt includes a straight run engageable with the roll of film; said endless belt, along said straight run, projecting outwardly of the adjacent edges of said support plates.

5. An automatic film feed device, as claimed in claim 1, in which said film stripper means comprises a support arm fixed to the respective operating shaft to extend laterally therefrom; and a stripper pawl pivoted on the free end of said support shaft.

6. An automatic film feed device, as claimed in claim 5, in which a side wall of said projector, adjacent said film delivery opening, is formed with an arcuate slot concentric with the axis of the operating shaft of said film stripper means; said pawl being pivoted on the free end of said support arm by a pivot extending through said arcuate slot.

7. An automatic film feed device, as claimed in claim 6, including a coil spring embracing said pivot and engaged with said pawl to bias said pawl to a predetermined angular orientation on said pivot.

8. An automatic film feed device, as claimed in claim 1, in which said driven member is a gear meshing with the gear associated with the operating shaft of said film threader means; said driving mechanism including intermediate gears connecting said driven member to the gear associated with the operating shaft of said film stripper means.

9. An automatic film feed device, as claimed in claim 8, in which the effective gear ratios between said operating shafts and said driven member are selected so that said film stripper means is engaged with the outer convolution of the roll of film in advance of engagement of said film threader means with the roll of film.

* * * * *